US012695993B2

(12) United States Patent
Kobayashi

(10) Patent No.: US 12,695,993 B2
(45) Date of Patent: Jul. 28, 2026

(54) ELECTRONIC DEVICE THAT ACQUIRES IMAGE DATA OF A CIRCULAR FISH-EYE IMAGE, ACQUIRES METADATA OF THE IMAGE, AND DISPLAYS AN IMAGE BASED ON THE IMAGE DATA

(71) Applicant: CANON KABUSHIKI KAISHA, Tokyo (JP)

(72) Inventor: Toru Kobayashi, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 218 days.

(21) Appl. No.: 18/631,282

(22) Filed: Apr. 10, 2024

(65) Prior Publication Data

US 2024/0365006 A1 Oct. 31, 2024

(30) Foreign Application Priority Data

Apr. 27, 2023 (JP) ................................ 2023-072965

(51) Int. Cl.
*H04N 23/698* (2023.01)
*H04N 23/63* (2023.01)

(52) U.S. Cl.
CPC ......... *H04N 23/698* (2023.01); *H04N 23/635* (2023.01)

(58) Field of Classification Search
CPC ............................ H04N 23/698; H04N 23/635
See application file for complete search history.

(56) References Cited

U.S. PATENT DOCUMENTS

| 2018/0365799 A1* | 12/2018 | Yokomizo | .............. | H04N 23/81 |
| 2022/0385830 A1* | 12/2022 | Shoda | .................. | H04N 5/2628 |
| 2022/0385883 A1* | 12/2022 | Kobayashi | ............. | G03B 37/06 |

FOREIGN PATENT DOCUMENTS

JP 2020123172 A 8/2020

* cited by examiner

*Primary Examiner* — Kathleen V Nguyen
(74) *Attorney, Agent, or Firm* — Venable LLP

(57) ABSTRACT

An electronic device acquires image data of a circular fish-eye image, acquires metadata of the image, and performs control to display an image based on the image data. Design information a position in the circular fish-eye image corresponding to an optical axis of a lens, a radius of the circular fish-eye image, an angle of view of the circular fish-eye image, and an angle of view of a target region of equirectangular conversion in the circular fish-eye image is stored in advance in a storage for one for more lenses. On a basis of the identification information, in one or more design information stored in the storage, design information corresponding to the lens used for photographing the acquired circular fish-eye image is read out from the storage, and, on a basis of the read-out design information, the control is performed such that the target region is identifiably displayed.

12 Claims, 10 Drawing Sheets

*FIG. 8*

ELECTRONIC DEVICE THAT ACQUIRES IMAGE DATA OF A CIRCULAR FISH-EYE IMAGE, ACQUIRES METADATA OF THE IMAGE, AND DISPLAYS AN IMAGE BASED ON THE IMAGE DATA

BACKGROUND OF THE INVENTION

This application claims the benefit of Japanese Patent Application No. 2023-072965, filed on Apr. 27, 2023, which is hereby incorporated by reference herein in its entirety.

FIELD OF THE INVENTION

The present invention relates to an electronic device and, more particularly, relates to an art of displaying a circular fish-eye image.

DESCRIPTION OF THE RELATED ART

There is a display device that displays a circular fish-eye image as it is (without converting a style). Japanese Patent Application Publication No. 2020-123172 discloses an art of generating a disposition image in which a plurality of circular fish-eye images are disposed.

A circular fish-eye image is converted to an equirectangular image (image of an equirectangular projection) in some cases. At this time, an angle of view of the circular fish-eye image is wider than an angle of view of the equirectangular image (region converted to the equirectangular image) in some cases. In other words, a region of a part of the circular fish-eye image is converted to the equirectangular image in some cases. For example, in order to obtain an equirectangular image corresponding to a VR (Virtual Reality) format such as VR180, a region corresponding to the angle of view at one hundred eighty (180) degrees in the circular fish-eye image corresponding to an angle of view wider than one hundred eighty (180) degrees is converted to an equirectangular image in some cases. And, in such a case, a desired equirectangular image cannot be obtained (a desired object was not taken, for example) in some cases.

SUMMARY OF THE INVENTION

The present invention provides a technique to enable easy obtainment of a desired equirectangular image.

An electronic device according to the present invention includes a processor, and a memory storing a program which, when executed by the processor, causes the electronic device to acquire image data of a circular fish-eye image, acquire metadata of the circular fish-eye image, and perform control to display an image based on the image data, wherein the control is performed such that, on a basis of the metadata, a target region of equirectangular conversion in the circular fish-eye image is identifiably displayed.

Further features of the present invention will become apparent from the following description of exemplary embodiments with reference to the attached drawings.

BRIEF DESCRIPTION OF THE DRAWINGS

FIG. 8 is a schematic diagram illustrating the display image according to Embodiment 2;

DESCRIPTION OF THE EMBODIMENTS

Figure 1:
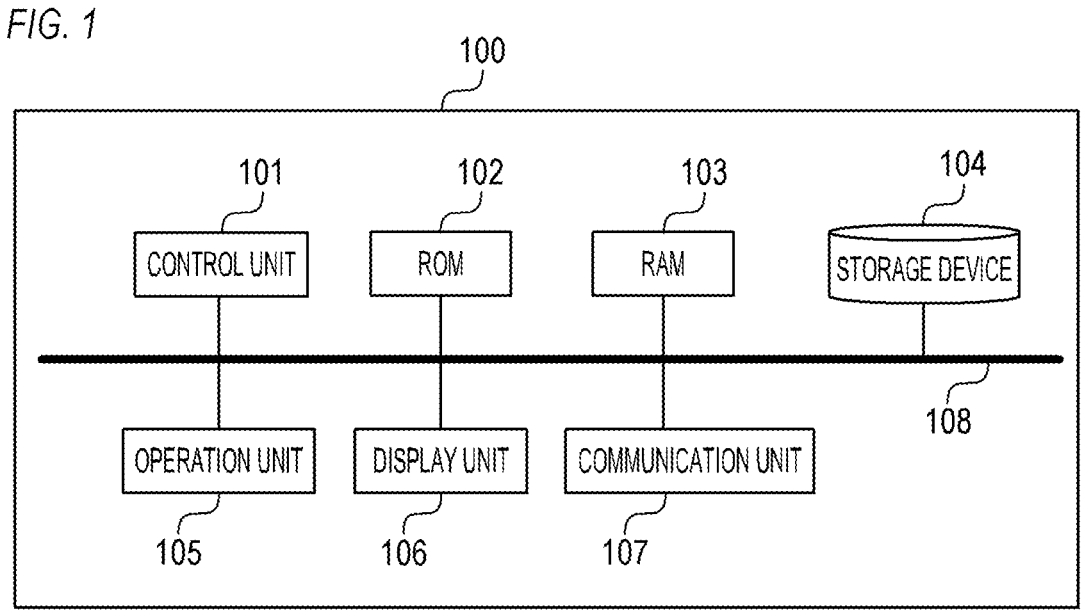
FIG. 1 is a block diagram illustrating a configuration of a display device.

Hereafter, embodiments of the present invention will be explained in detail on the basis of the attached drawings. FIG. 1 is a block diagram illustrating a configuration of a display device 100 as an example of an electronic device according to this Embodiment. It is to be noted that the present invention is not limited to the display device but can be applied to various electronic devices such as a digital camera, a personal computer, a smartphone, and a tablet terminal.

A control unit 101 is a Central Processing Unit (CPU), for example, and controls the entire display device 100. A Read Only Memory (ROM) 102 stores various types of data (programs and parameters, for example) not requiring changes. A Random Access Memory (RAM) 103 temporarily stores various types of data (programs and parameters, for example).

A storage device 104 stores various types of data. For example, the storage device 104 is a Solid State Drive (SSD), a Hard Disk Drive (HDD) or a flash storage fixed (incorporated) in the display device 100. The storage device 104 may be an optical disk, a magnetic card, an optical card, an IC card or a memory card, which are detachably attached to the display device 100.

An operation unit 105 includes operation members such as a button or a touch panel and accepts an operation by a user (user operation). The operation unit 105 may be a receiving unit that receives an operation signal according to the user operation from an operation device such as a remote controller to the operation device in a wired or wireless manner. A display unit 106 displays images based on various types of image data such as image data stored in the display device 100 in advance, image data generated by the display device 100, and image data shared by the display device 100. A communication unit 107 is a communication interface connected to an external device in a wired or a wireless manner for communication. A system bus 108 is connected to each unit of the display device 100 in order to enable communication in the display device 100.

Figure 2:
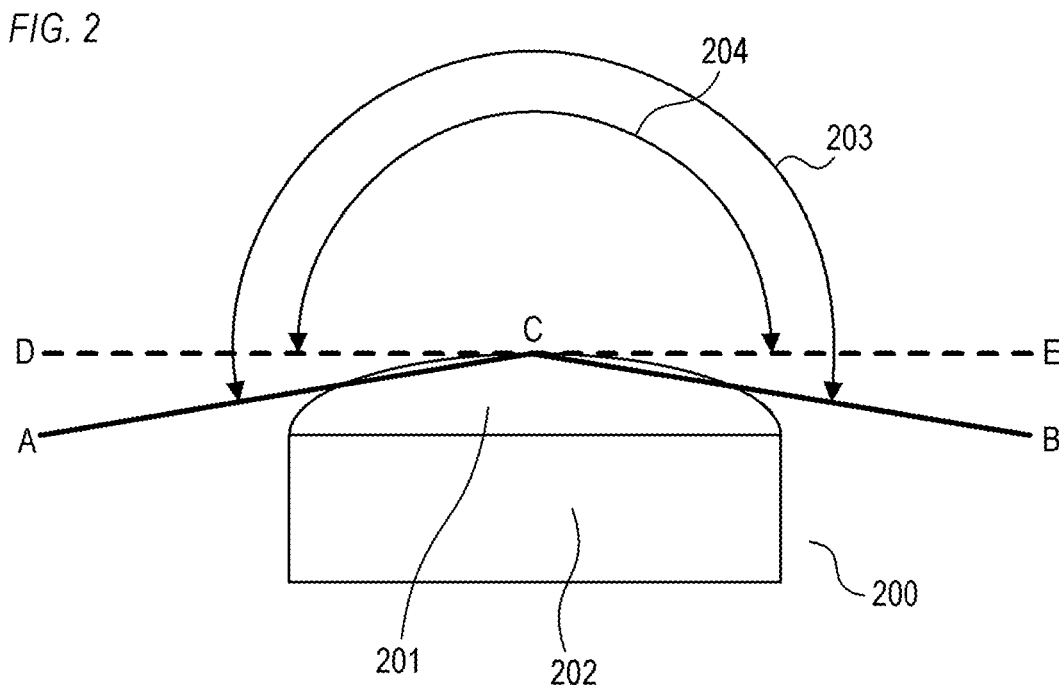
FIG. 2 is a schematic diagram illustrating a configuration of a fish-eye lens.

FIG. 2 is a schematic diagram illustrating a configuration of a fish-eye lens 200 according to this Embodiment. The fish-eye lens 200 is a lens used for image pickup of a circular fish-eye image. FIG. 2 is a diagram of the fish-eye lens 200 seen from above (direction perpendicular to an optical axis). The fish-eye lens 200 has a lens unit 201 and a support unit 202. The lens unit 201 is supported by the support unit 202 (support body). An angle 203 between a line segment AC and a line segment CB is an angle of view of an image pickup range of the fish-eye lens 200 (range whose image is picked up by using the fish-eye lens 200) and is larger than one hundred eighty (180) degrees, for example. An angle 204 between a line segment DC and a line segment CE is an angle of view of a target region of equirectangular conversion (a range of target converted to an equirectangular image (image of an equirectangular projection) in an image pickup range, conversion target region) and it is one hundred eighty (180) degrees, for example.

Figure 3A:
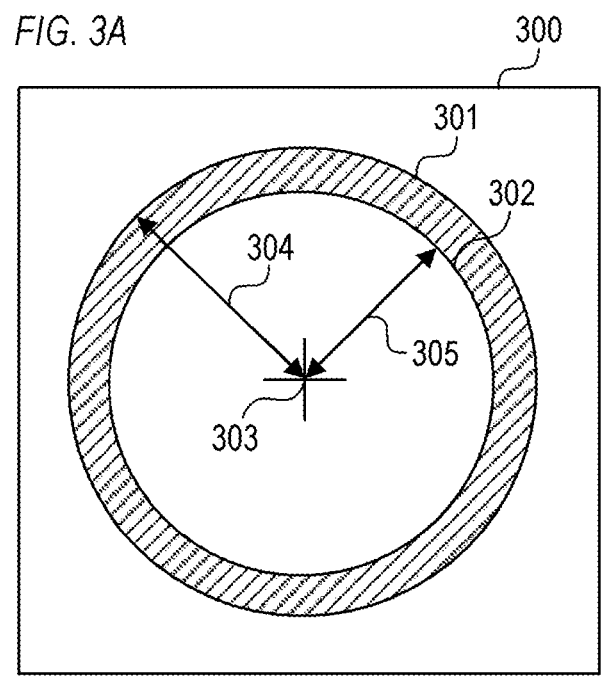
FIGS. 3A and 3B are schematic diagrams illustrating images including a circular fish-eye region.
Figure 3B:
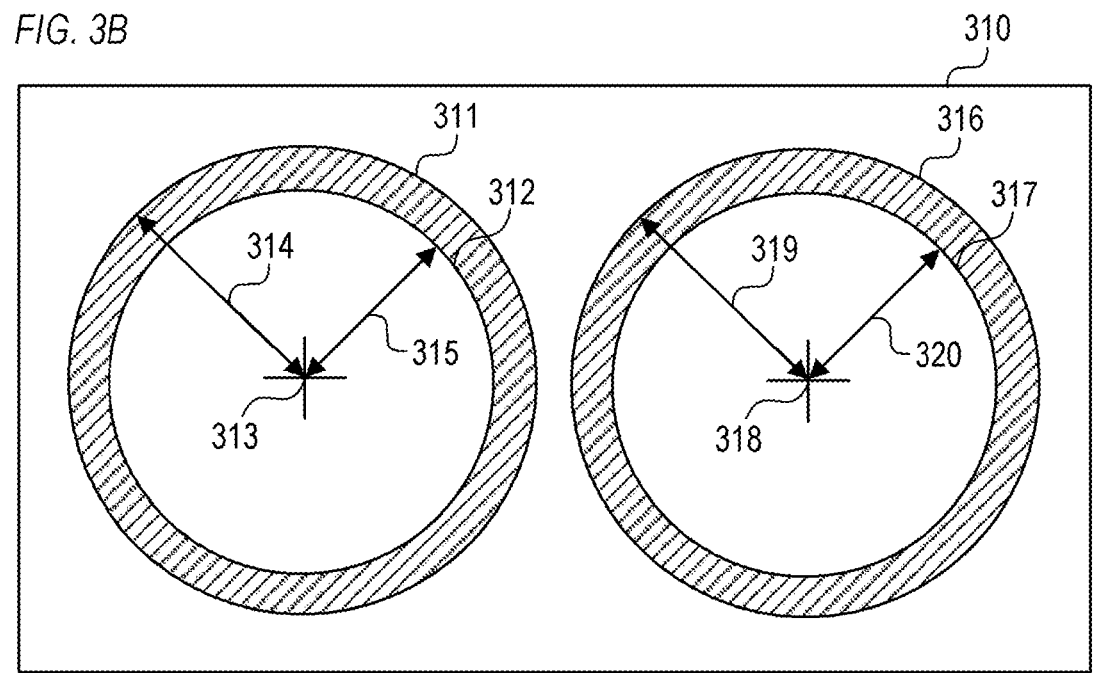

FIGS. 3A and 3B are schematic diagrams illustrating images 300, 310 expressed by image data (image data of the circular fish-eye images) according to this Embodiment. The image 300 in FIG. 3A includes one circular fish-eye region 301 (region of the circular fish-eye image). The circular fish-eye region 301 (circular fish-eye image) corresponds to an angle 203 of FIG. 2, for example. A region 302, which is a part of the circular fish-eye region 301, is a conversion target region and corresponds to the angle 204 in FIG. 2, for example. A region outside the conversion target region 302 (hatched region) in the circular fish-eye region 301 is a region whose image was picked up but is not included in the equirectangular image. A position 303 in the circular fish-eye region 301 (in the circular fish-eye image) is an optical-axis corresponding position corresponding to an optical axis (optical-axis center position) of a fish-eye lens (the fish-eye lens 200, for example) used for image pickup of the circular fish-eye region 301. An arrow 304 indicates a radius of the circular fish-eye region 301. An arrow 305 indicates a radius of the conversion target region 302.

An image 310 in FIG. 3B includes two circular fish-eye regions 311, 316. By using a plurality of the fish-eye lenses, image data of an image including a plurality of circular fish-eye regions can be obtained. A region 312, which is a part of the circular fish-eye region 311, is a conversion target region. A region outside the conversion target region 312 (hatched region) in the circular fish-eye region 311 is a region whose image was picked up, but is not included in the equirectangular image. A position 313 in the circular fish-eye region 311 is an optical-axis corresponding position corresponding to the optical axis of the fish-eye lens used for image pickup of the circular fish-eye region 311. An arrow 314 indicates a radius of the circular fish-eye region 311. An arrow 315 indicates a radius of the conversion target region 312. A region 317, which is a part of the circular fish-eye region 316, is a conversion target region. A region outside the conversion target region 317 (hatched region) in the circular fish-eye region 316 is a region whose image was picked up as an image, but is not included in the equirectangular image. A position 318 in the circular fish-eye region 316 is an optical-axis corresponding position corresponding to an optical axis of a fish-eye lens used for image pickup of the circular fish-eye region 316. An arrow 319 indicates a radius of the circular fish-eye region 316. An arrow 320 indicates a radius of the conversion target region 317.

Figure 4:
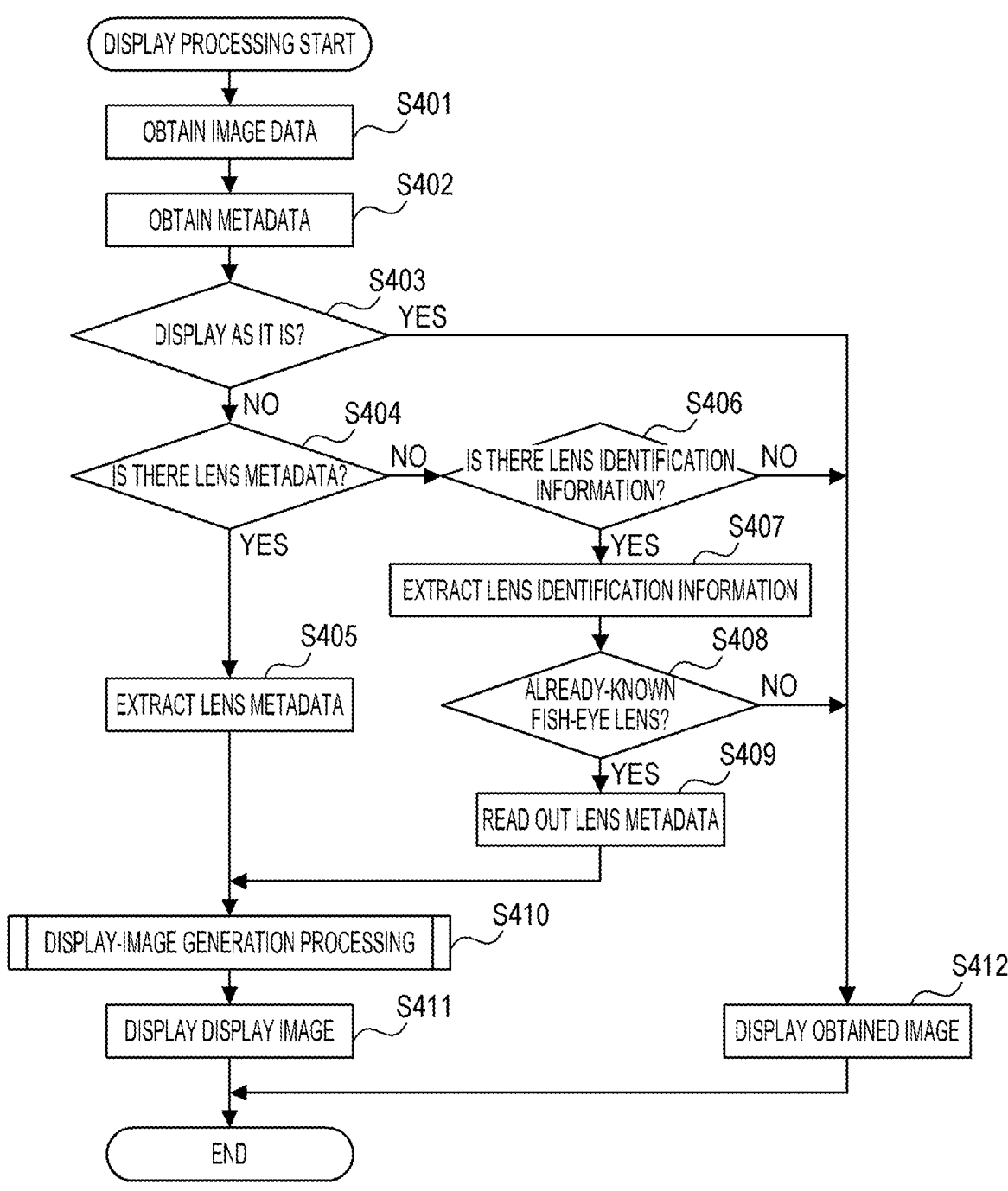
FIG. 4 is a flowchart of display processing.

FIG. 4 is a flowchart of display processing executed in the display device 100. The display processing in FIG. 4 is realized by the control unit 101 that expands the program stored in the ROM 102 to the RAM 103 and executes it. When the display device 100 is started, for example, the control unit 101 starts the display processing in FIG. 4. In the display processing in FIG. 4, an image based on the image data of the circular fish-eye image is displayed.

At S401, the control unit 101 obtains image data of the circular fish-eye image from the storage device 104 or from an external device via the communication unit 107. Any image data of a still image, a moving image, a RAW still image, and a RAW moving image may be obtained.

At S402, the control unit 101 obtains metadata of the image data obtained at S401 (metadata of the circular fish-eye image) from the storage device 104 or from the external device via the communication unit 107.

At S403, the control unit 101 determines whether the image expressed by the image data obtained at S401 is to be displayed as it is (without executing image processing as processing at S410, which will be described later) or not. For example, the control unit 101 determines whether setting without executing the image processing (setting of displaying an image expressed by the obtained image data as it is) is valid or not. The control unit 101 may determine whether the user gave an instruction not to execute the image processing (instruction to display the image expressed by the obtained image data as it is) or not. If the image expressed by the obtained image data is to be displayed as it is, the processing proceeds to S412, while if not, the processing proceeds to S404. According to the processing at S403, whether the image expressed by the obtained image data is to be displayed as it is or not is switched in accordance with the instruction from the user. As a result, convenience is improved.

At S404, the control unit 101 determines whether the metadata obtained at S402 includes lens metadata required for the processing at S410 or not. If the metadata includes the lens metadata, the processing proceeds to S405, while, if not, the processing proceeds to S406. The lens metadata includes at least any of an optical-axis corresponding position of the circular fish-eye region (circular fish-eye image), a radius of the circular fish-eye region, a size of an angle of view of the circular fish-eye region, and a size of an angle of view of the conversion target region, for example. The lens metadata may be design information (design values) determined for the type of the lens or may be individual information (individual values) such as a measurement result corresponding to combination of a lens and an image pickup device. Since the individual information is more reliable than the design information, it is preferable to obtain the individual information.

At S405, the control unit 101 extracts (obtains) the lens metadata from the metadata obtained at S402 and stores it in the RAM 103. When a plurality of the circular fish-eye regions are included in the image obtained at S401, a plurality of pieces of the lens metadata corresponding to the plurality of circular fish-eye regions, respectively, are extracted.

There is such an image pickup device that can pick up a circular fish-eye image by wearing a fish-eye lens but cannot record the lens metadata due to a reason that firmware of the image pickup device is aged, or the like. By considering such an image pickup device, the lens metadata (design information) of one or more lenses may be stored in the storage unit (the storage device 104, for example) in advance. And, general metadata such as lens identification information (a lens name, for example) for identifying the fish-eye lens used for image pickup of the circular fish-eye image is obtained, and, on the basis of the obtained identification information, the lens metadata corresponding to the fish-eye lens, which was used, may be read out from the storage device 104. At S406 to S409, the lens metadata is obtained by such a method.

At S406, the control unit 101 determines whether the lens identification information is included in the metadata obtained at S402 or not. If the lens identification information is included in the metadata, the processing proceeds to S407, while if not, the processing proceeds to S412.

At S407, the control unit 101 extracts (obtains) the lens identification information from the metadata obtained at S402 and stores it in the RAM 103.

At S408, the control unit 101 determines whether the lens identification information obtained at S407 corresponds to the already-known fish-eye lens (fish-eye lens whose lens metadata is stored in the storage device 104) or not. If the lens identification information corresponds to the already-known fish-eye lens, the processing proceeds to S409, while, if not, the processing proceeds to S412.

At S409, the control unit 101 reads out the lens metadata of the fish eye lens corresponding to the lens identification information obtained at S407 from the storage device 104. When the plurality of circular fish-eye regions are included in the image obtained at S401, the plurality of pieces of the lens metadata corresponding to each of the plurality of circular fish-eye regions are read out.

At S410, the control unit 101 generates display image data (display-image generation processing) on the basis of the lens metadata obtained at S405 or S409. Details of the display-image generation processing will be described later by using FIGS. 5, 7, and 9.

At S411, the control unit 101 displays the image on the display unit 106 in accordance with the display image data generated at S410.

At S412, the control unit 101 displays the image on the display unit 106 in accordance with the image data obtained at S401.

Embodiment 1

Figure 5:
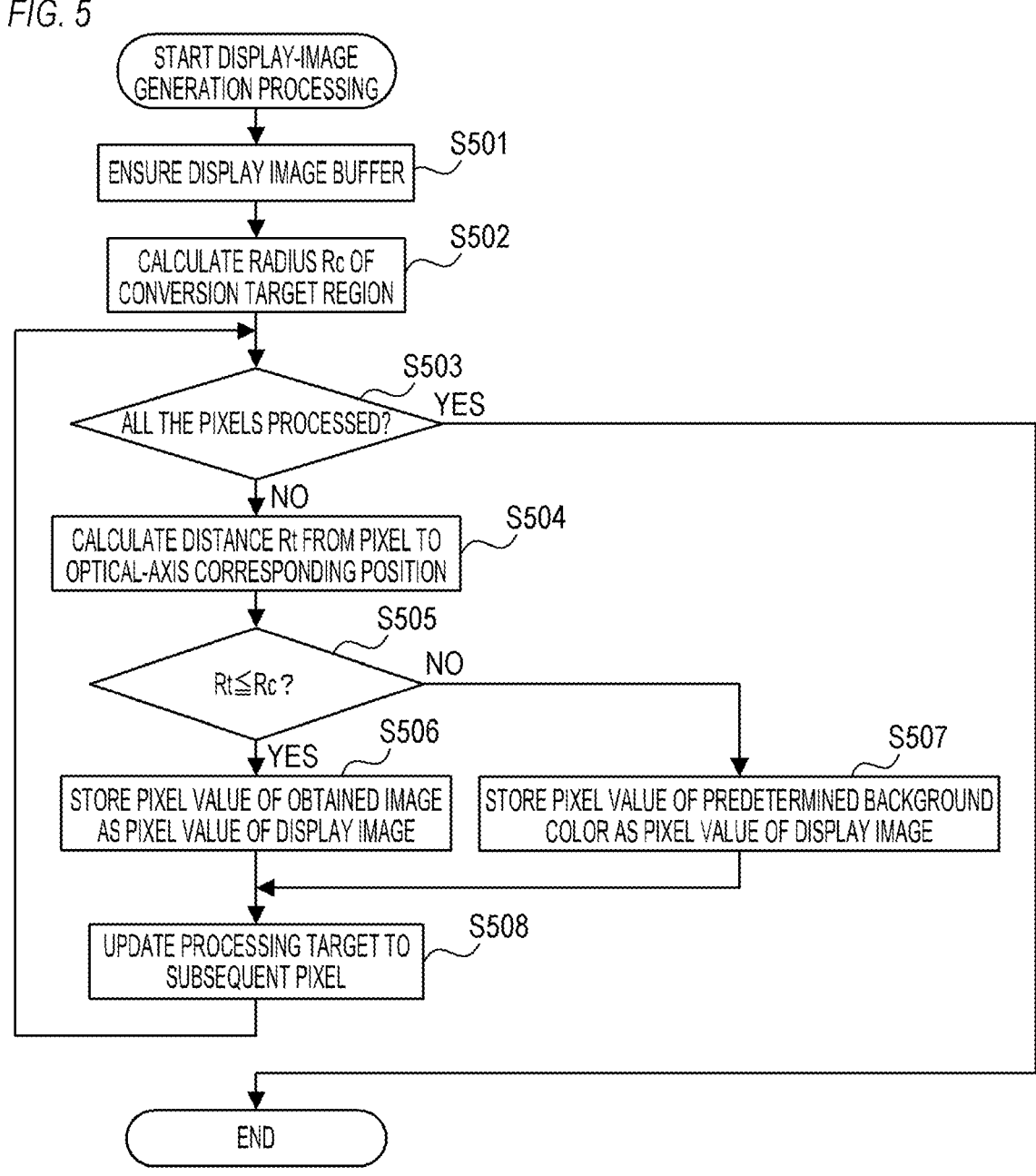
FIG. 5 is a flowchart of display-image generation processing according to Embodiment 1.

FIG. 5 is a flowchart of the display-image generation processing according to Embodiment 1 (S410 in FIG. 4). The display-image generation processing in FIG. 5 is realized by the control unit 101 that expands the program stored in the ROM 102 to the RAM 103 and executes it.

At S501, the control unit 101 ensures, in the RAM 103, a display image buffer of the same size as the size of the image data obtained at S401 in FIG. 4.

At S502, the control unit 101 calculates a distance from the optical-axis corresponding position to an end of the conversion target region (outer peripheral pixel), that is, a radius of the conversion target region for each circular fish-eye region of the image data obtained at S401. For example, it is assumed that the radius indicated by the arrow 304 in FIG. 3A (radius of the circular fish-eye region 301) is Rr, the angle 203 in FIG. 2 (angle of view of the circular fish-eye region 301) is Or, and the angle 204 (angle of view of the conversion target region 302) is Oc. And, it is assumed that the radius indicated by the arrow 305 (radius of the conversion target region 302) is Rc. The radius Rc can be calculated by using the following Equation 1:

$$Rc = Rr \times (\theta c / \theta r) \qquad \text{(Equation 1)}$$

In the display-image generation processing in FIG. 5, processing at S504 to S508 is executed for each pixel of the image data obtained at S401. At S503, the control unit 101 determines whether the processing at S504 to S508 has been executed for all the pixels of the image data obtained at S401 or not. If the processing at S504 to S508 has been executed for all the pixels, the display-image generation processing is finished, while if not, the processing proceeds to S504.

At S504, the control unit 101 calculates a distance from the pixel of a processing target to the optical-axis corresponding position. For example, it is assumed that a coordinate (horizontal position, perpendicular position) of the pixel of the processing target is (Xt, Yt), and a coordinate of the position 303 corresponding to the optical axis in FIG. 3A is (Xc, Yc). Then, a distance from the pixel of the processing target to the position 303 corresponding to the optical axis is assumed to be Rt. A distance Rt can be calculated by using the following Equation 2:

$$Rt = \left((Xt - Xc)^2 + (Yt - Yc)^2\right)^{1/2} \qquad \text{(Equation 2)}$$

If the image obtained at S401 includes a plurality of the circular fish-eye regions, the control unit 101 may calculate a plurality of distances from the pixel of the processing target to a plurality of the optical-axis corresponding positions corresponding to the plurality of circular fish-eye regions and employ (select) their minimum values as the distance Rt. After that, the circular fish-eye region corresponding to the distance Rt (circular fish-eye region of the processing target) shall be described as a corresponding fish-eye region.

At S505, the control unit 101 determines whether the distance Rt calculated at S504 is equal to or less than the radius Rc calculated at S502 (radius of the conversion target region in the corresponding fish-eye region) or not. That is, the control unit 101 determines whether the pixel of the processing target is included in the conversion target region in the corresponding fish-eye region or not. If the distance Rt is equal to or less than the radius Rc, that is, if the pixel of the processing target is included in the conversion target region, the processing proceeds to S506, while, if not, the processing proceeds to S507.

At S506, the control unit 101 stores a pixel value of the pixel of the processing target (pixel value of the image data obtained at S401) in the display image buffer as a pixel value of the pixel of the display image data corresponding to the pixel of the processing target.

At S507, the control unit 101 stores a pixel value of a predetermined background color (black, for example) in the display image buffer as a pixel value of the pixel of the display image data corresponding to the pixel of the processing target.

At S508, the control unit 101 updates the processing target to a subsequent pixel. For example, first, a pixel at an upper left corner of the image is selected as a processing target. Then, processing of selecting a pixel on the right of the current processing target as a new processing target is repeated. When the current processing target is the pixel on a right end of the image, a pixel on a left end on one line below the current processing target is selected as the processing target. Then, the processing of selecting a pixel on the right of the current processing target as a new processing target is repeated. When the current processing target is the pixel on a lower right corner of the image, the pixel on the upper left corner of the image is selected again as the processing target, and the display-image generation processing is finished.

By executing the processing at S504 to S508 for all the pixels of the image data obtained at S401, the display image data is generated in the display image buffer.

Figure 6:
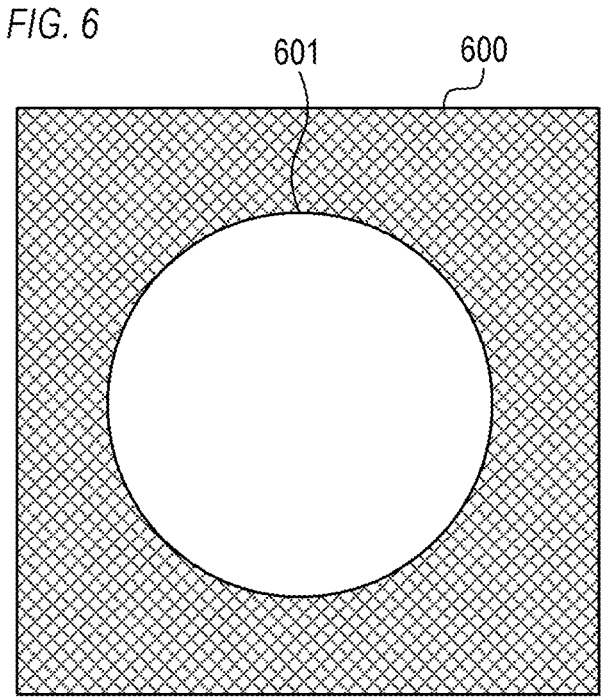
FIG. 6 is a schematic diagram illustrating a display image according to Embodiment 1.

FIG. 6 is a schematic diagram illustrating a display image 600 (image expressed by the display image data) according to Embodiment 1. A region 601 of the display image 600 is the conversion target region and a valid region expressing an object. A region outside the conversion target region 601 (shaded region) is a region painted in a predetermined background color and an invalid region not expressing the object.

As described above, according to Embodiment 1, on the basis of the metadata of the circular fish-eye image, the conversion target region in the circular fish-eye image is identifiably displayed. Specifically, the circular fish-eye image is displayed in a state in which the region outside the conversion target region is painted in the predetermined color. As a result, the user can easily grasp the conversion target region for photographing and thus, can easily obtain a desired equirectangular image. It is to be noted that, when the image data of the image including the regions of a plurality of the circular fish-eye images are obtained, the respective conversion target regions of the plurality of circular fish-eye images are identifiably displayed.

Embodiment 2

Figure 7:
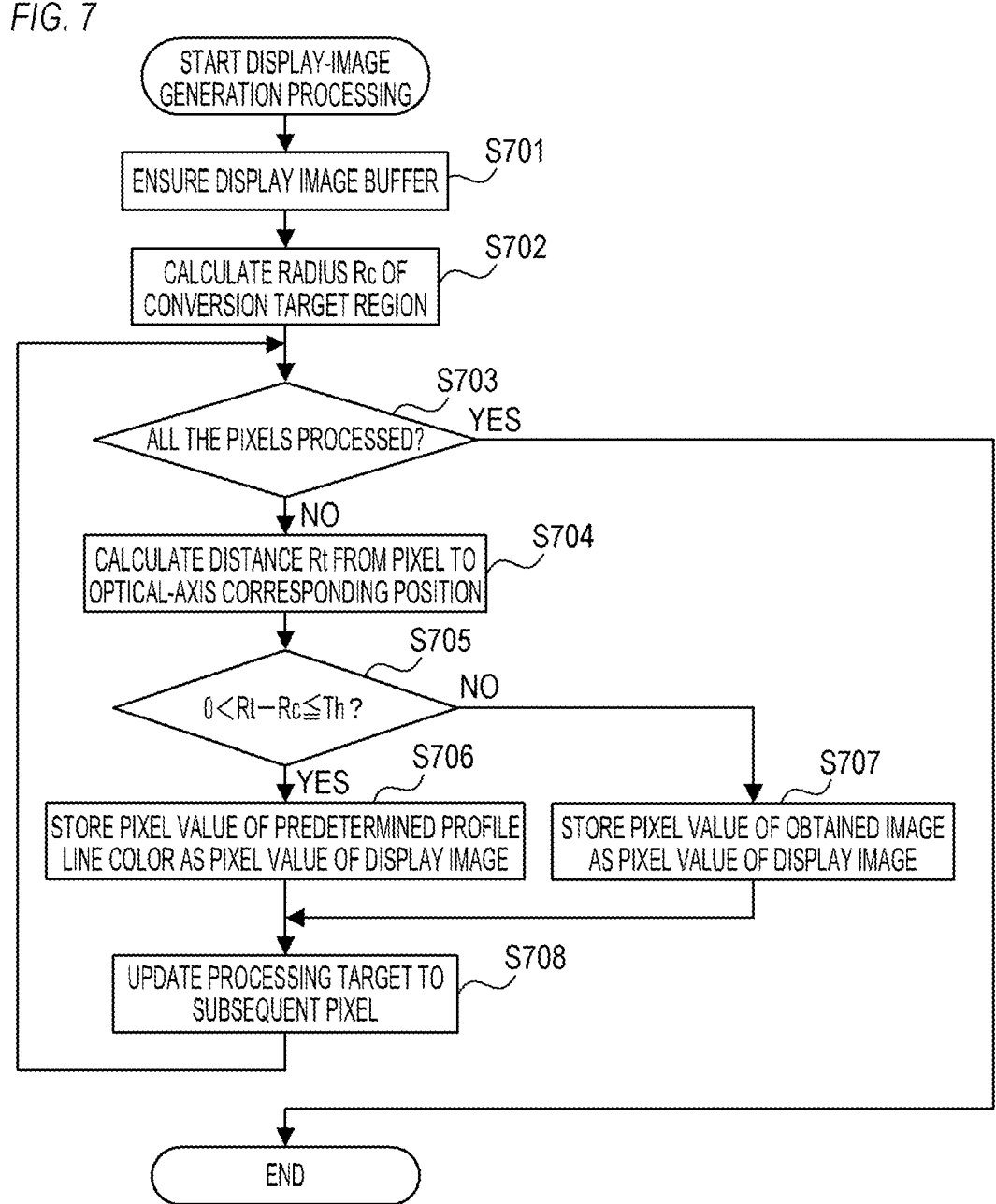
FIG. 7 is a flowchart of the display-image generation processing according to Embodiment 2.

FIG. 7 is a flowchart of the display-image generation processing (S410 in FIG. 4) according to Embodiment 2. The display-image generation processing in FIG. 7 is realized by the control unit 101 that expands the program stored in the ROM 102 to the RAM 103 and executes it.

At S701, similarly to S501 in FIG. 5, the control unit 101 ensures the display image buffer with the same size as the size of the image data obtained at S401 in FIG. 4 in the RAM 103.

At S702, similarly to S502, the control unit 101 calculates a distance from the optical-axis corresponding position to an end of the conversion target region (outer peripheral pixel), that is, the radius Rc of the conversion target region for each circular fish-eye region of the image data obtained at S401.

In the display-image generation processing in FIG. 7, the processing at S704 to S708 is executed for each pixel of the image data obtained at S401. At S703, similarly to S503, the control unit 101 determines whether the processing at S704 to S708 has been executed for all the pixels of the image data obtained at S401 or not. If the processing at S704 to S708 has been executed for all the pixels, the display-image generation processing is finished, while, if not, the processing proceeds to S704.

At S704, similarly to S504, the control unit 101 calculates the distance Rt from the pixel of the processing target to the optical-axis corresponding position.

At S705, the control unit 101 determines whether a value obtained by subtracting the radius Rc (radius of the conversion target region in the corresponding fish-eye region) calculated at S702 from the distance Rt calculated at S704 is greater than zero and equal to or less than a threshold value Th or not. That is, the control unit 101 determines whether the pixel of the processing target is included in the profile part of the conversion target region or not. If the value obtained by subtracting the radius Rc from the distance Rt is greater than zero and equal to or less than the threshold value Th, that is, if the pixel of the processing target is included in a profile part, the processing proceeds to S706, while, if not, the processing proceeds to S707.

At S706, the control unit 101 stores a pixel value of a predetermined profile-line color (red, for example) in the display image buffer as a pixel value of the pixel of the display image data corresponding to the pixel of the processing target.

At S707, similarly to S506, the control unit 101 stores the pixel value (pixel value of the image data obtained at S401) of the pixel of the processing target in the display image buffer as a pixel value of the pixel of the display image data corresponding to the pixel of the processing target.

At S708, similarly to S508, the control unit 101 updates the processing target to a subsequent pixel.

By executing the processing at S704 to S708 for all the pixels of the image data obtained at S401, the display image data is generated in the display image buffer.

Figure 8:
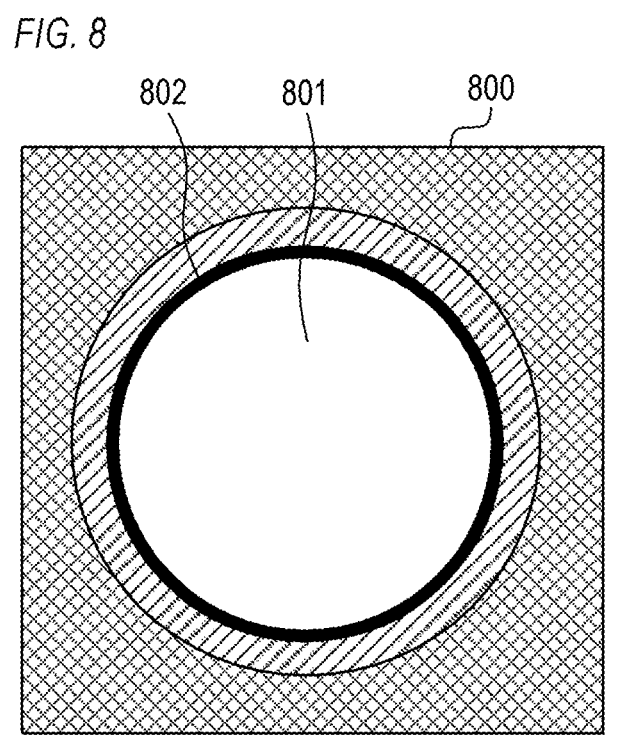

FIG. 8 is a schematic diagram illustrating a display image 800 (image expressed by the display image data) according to Embodiment 2. In the display image 800, a shaded region is a region not photographed and an invalid region not expressing an object. A region indicated by diagonal lines is a region photographed, but not included in the equirectangular image, and is a valid region expressing the object. A region 801 is a conversion target region and is a valid region expressing the object. The region indicated by diagonal lines is a region outside the conversion target region 801 in the circular fish-eye region, and the shaded region is a region outside the circular fish-eye region. In the display image 800, a profile line 802 of the conversion target region 801 is highlighted.

As described above, according to Embodiment 2, the circular fish-eye image is displayed in a state where the profile line of the conversion target region is highlighted on the basis of the metadata of the circular fish-eye image. As a result, the user can perform photographing while easily grasping the conversion target region and thus, can easily obtain a desired equirectangular image.

Embodiment 3

Figure 9:
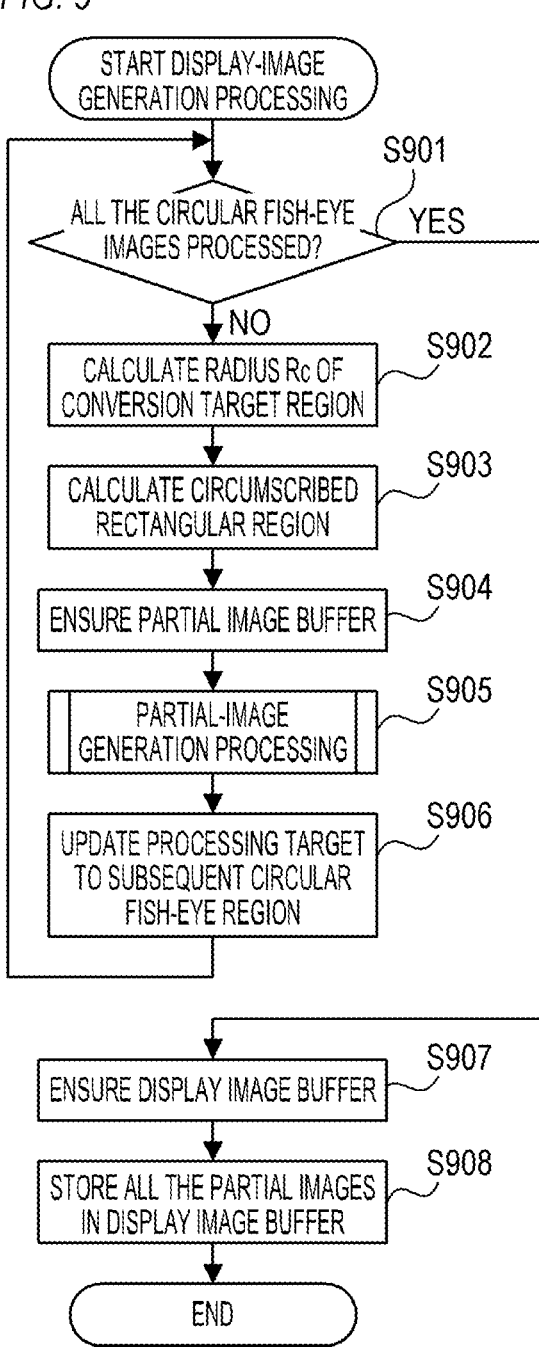
FIG. 9 is a flowchart of the display-image generation processing according to Embodiment 3.

FIG. 9 is a flowchart of the display-image generation processing (S410 in FIG. 4) according to Embodiment 3. The display-image generation processing in FIG. 9 is realized by the control unit 101, which expands the program stored in the ROM 102 to the RAM 103, and executes it.

In the display-image generation processing in FIG. 9, processing at S902 to S906 is executed for each of the circular fish-eye regions of the image data obtained at S401 in FIG. 4. At S901, the control unit 101 determines whether the processing at S902 to S906 has been executed for all the circular fish-eye regions in the image data obtained at S401 or not. If the processing at S902 to S906 has been executed for all the circular fish-eye regions, the processing proceeds to S907, while, if not, the processing proceeds to S902.

At S902, similarly to S502, the control unit 101 calculates a distance from the optical-axis corresponding position of the circular fish-eye region of the processing target to an end of the conversion target region (outer peripheral pixel), that is, the radius Rc of the conversion target region.

At S903, the control unit 101 calculates a rectangular region (circumscribed rectangular region) circumscribing the conversion target region in the circular fish-eye region of the processing target. For example, it is assumed that coordinates of the optical-axis corresponding position 303 in FIG. 3A is (Xc, Yc), and a radius (radius of the conversion target region 302) indicated by the arrow 305 is Rc. A region with the pixel at the upper left corner at the coordinates of (Xc−Rc, Yc−Rc), a width of (Rc×2), and a height of (Rc×2) can be calculated as the circumscribed rectangular region of the conversion target region 302.

At S904, the control unit 101 ensures a buffer of an image size with a width of (Rc×2) and a height of (Rc×2) as a partial image buffer related to the circular fish-eye region of the processing target in the RAM 103.

At S905, the control unit 101 generates partial image data related to the circular fish-eye region of the processing target (partial-mage generation processing). Though the details are omitted, an image expressed by the partial image data (partial image) is an image of the rectangular region circumscribing the conversion target region (circumscribed rectangular region) in the circular fish-eye region of the processing target. Details of the partial-image generation processing will be described later by using FIG. 10.

At S906, the control unit 101 updates the processing target to the subsequent circular fish-eye region.

At S907, the control unit 101 ensures a display image buffer that stores all pieces of the generated partial image data in the RAM 103. It is assumed that each of the width and the height of the partial image is (Rc×2). When there is one circular fish-eye region, a buffer with an image size of the width of (Rc×2) and the height of (Rc×2) is ensured as a display image buffer. In Embodiment 3, if a plurality of the circular fish-eye regions are included in the image obtained at S401, a plurality of the partial images corresponding to the plurality of circular fish-eye regions, respectively, are aligned in a left-right direction (horizontal direction, width direction) without a gap. Thus, if two circular fish-eye regions are included in the image obtained at S401, a buffer of the image size with the width of ((Rc×2)×2) and the height of (Rc×2) is ensured as the display image buffer.

At S908, the control unit 101 stores all the pieces of the generated partial image data in the display image buffer. As a result, in the display image buffer, the display image data including all the pieces of the partial image data is generated.

Figure 10:
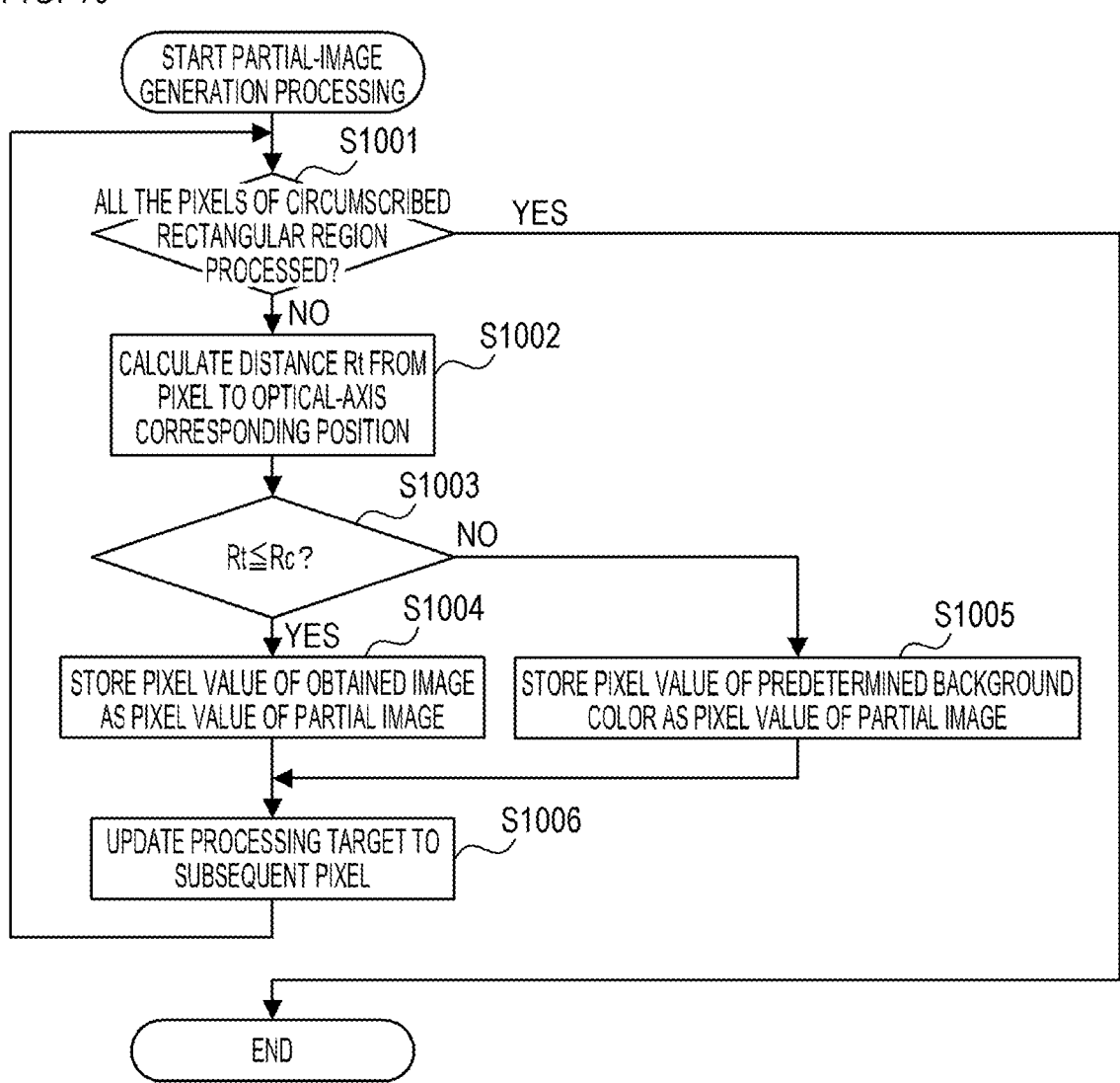
FIG. 10 is a flowchart of partial-image generation processing according to Embodiment 3.

FIG. 10 is a flowchart of the partial-image generation processing (S905 in FIG. 9) according to Embodiment 3. The partial-image generation processing in FIG. 10 is realized by the control unit 101, which expands the program stored in the ROM 102 to the RAM 103 and executes it.

In the partial-image generation processing in FIG. 10, for each of the pixels of the circumscribed rectangular region calculated (determined) at S903 in FIG. 9, the processing at S1002 to S1006 is executed. At S1001, the control unit 101 determines whether the processing at S1002 to S1006 has been executed for all the pixels in the circumscribed rectangular region calculated (determined) at S903 or not. If the processing at S1002 to S1006 has been executed for all the pixels, the display-image generation processing is finished, while, if not, the processing proceeds to S1002.

At S1002, similarly to S504, the control unit 101 calculates the distance Rt from the pixel of the processing target to the position corresponding to the optical axis (position corresponding to the optical axis corresponding to the corresponding fish-eye region of the processing target).

At S1003, similarly to S505, the control unit 101 determines whether the distance Rt calculated at S1002 is equal to or less than the radius Rc (radius of the conversion target region in the corresponding fish-eye region of the processing target) calculated at S902 or not. That is, the control unit 101 determines whether the pixel of the processing target is included in the conversion target region in the corresponding fish-eye region of the processing target or not. If the distance Rt is equal to or less than the radius Rc, that is, if the pixel of the processing target is included in the conversion target region, the processing proceeds to S1004, while, if not, the processing proceeds to S1005.

At S1004, the control unit 101 stores the pixel value of the pixel of the processing target (pixel value of the image data obtained at S401) in the partial image buffer as a pixel value of the pixel of the partial image data corresponding to the pixel of the processing target.

At S1005, the control unit 101 stores the pixel value of the predetermined background value (black, for example) in the partial image buffer as a pixel value of the pixel of the partial image data corresponding to the pixel of the processing target.

At S1006, the control unit 101 updates the processing target to the subsequent pixel. For example, the pixel at the upper left corner of the circumscribed rectangular region is first selected as a processing target. Then, processing in which the pixel on the right of the current processing target is selected as a new processing target is repeated. If the current processing target is a pixel on the right end in the circumscribed rectangular region, the pixel on the left end one line below the current processing target is selected as a processing target. Then, the processing, in which the pixel on the right of the current processing target is selected as a new processing target, is repeated. If the current processing target is a pixel at the lower right corner in the circumscribed rectangular region, the pixel at the upper left corner of the circumscribed rectangular region is selected as the processing target again, and partial-image generation processing is finished.

By executing the processing at S1002 to S1006 for all the pixels of a circumscribed rectangular region, partial image data is generated in a partial image buffer.

Figure 11:
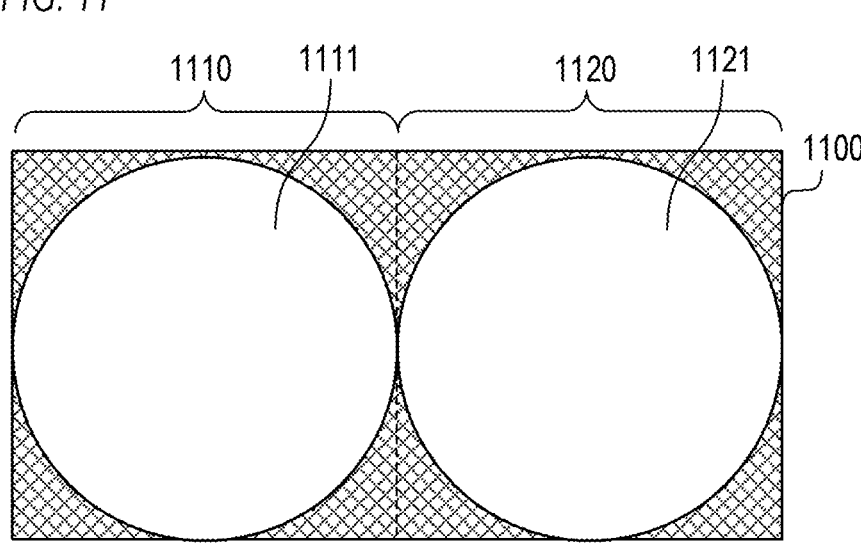
FIG. 11 is a schematic diagram illustrating the display image according to Embodiment 3.

FIG. 11 is a schematic diagram illustrating a display image 1100 (image expressed by the display image data) according to Embodiment 3. The display image 1100 is a display image when two circular fish-eye regions are included in the image obtained at S401. In the display image 1100, each of a region 1110 and a region 1120 is a region of the partial images (a partial image region, a circumscribed rectangular region of the conversion target region). In the partial image region 1110, a region 1111 is a conversion target region and a valid region expressing the object. In the partial image region 1110, a region on the outer side of the conversion target region 1111 (region indicated by shading) is a region painted in the predetermined background color and an invalid region not expressing the object. Similarly, in the partial image region 1120, a region 1121 is a conversion target region and is a valid region expressing the object. In the partial image region 1120, a region on the outer side of the conversion target region 1121 (region indicated by shading) is a region painted in the predetermined background color and an invalid region not expressing the object. The partial image region 1110 and the partial image region 1120 are aligned left and right without a clearance.

It is to be noted that an aligning direction of a plurality of the partial image regions in the display image is not limited to the left-right direction, but may be an up-down direction (perpendicular direction, height direction), for example. The alignment of the plurality of partial image regions in the display image may be the same as the alignment of a plurality of the circular fish-eye regions in the obtained image. There may be a clearance between the plurality of partial image regions. The number of the circular fish-eye regions is not particularly limited, or the number of partial image regions is not particularly limited, either. If only one circular fish-eye region is included in the obtained image, an image such as the partial image region 1110 or the partial image region 1120 only is obtained as a display image.

As described above, according to Embodiment 3, similarly to Embodiment 1, the region on the outer side of the conversion target region is painted in the predetermined color. As a result, the user can easily grasp the conversion target region and perform photographing and thus, can easily obtain a desired equirectangular image. It is to be noted that a method of making the conversion target region identifiable is not particularly limited, and a profile line of the conversion target region may be highlighted similarly to Embodiment 2.

Moreover, according to Embodiment 3, since the circumscribed rectangular region of the conversion target region is extracted and displayed, a ratio of the conversion target region occupying the display image can be made larger. And thus, fine adjustment such that the desired object is disposed at a desired position in the conversion target region can be made easily, and a desired equirectangular image can be obtained more easily.

It is to be noted that the aforementioned Embodiments (including variations) are only examples, and a configuration obtained by deforming or changing the configuration of the aforementioned Embodiments as appropriate within a range of the gist of the present invention is also included in the present invention. A configuration obtained by combining the configurations of the aforementioned Embodiments are also included in the present invention.

According to the present invention, a desired equirectangular image can be obtained easily.

OTHER EMBODIMENTS

Embodiment(s) of the present invention can also be realized by a computer of a system or an apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., an application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., a central processing unit (CPU), or a micro processing unit (MPU)) and may include a network of separate computers or separate processors to read out and to execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:
1. An electronic device comprising:
a processor; and
a memory storing a program which, when executed by the processor, causes the electronic device:
    to acquire image data of a circular fish-eye image;
    to acquire metadata of the circular fish-eye image; and
    to perform control to display an image based on the image data, wherein design information including at least one of a position in the circular fish-eye image corresponding to an optical axis of a lens, a radius of the circular fish-eye image, an angle of view of the circular fish-eye image, and an angle of view of a target region of equirectangular conversion in the circular fish-eye image is stored in advance in a storage for one for more lenses,
the metadata is identification information of a lens used for photographing the acquired circular fish-eye image,
on a basis of the identification information, in one or more design information stored in the storage, design information corresponding to the lens used for photographing the acquired circular fish-eye image is read out from the storage, and,
on a basis of the read-out design information, the control is performed such that the target region is identifiably displayed.

2. The electronic device according to claim 1, wherein the control is performed such that the circular fish-eye image is displayed in a state in which a region on an outer side of the target region is painted in a predetermined color.

3. The electronic device according to claim 1, wherein the control is performed such that the circular fish-eye image is displayed in a state in which a profile line of the target region is highlighted.

4. The electronic device according to claim 1, wherein the metadata includes at least one of a position in the circular fish-eye image corresponding to an optical axis of a lens used for photographing the circular fish-eye image, a radius of the circular fish-eye image, an angle of view of the circular fish-eye image, and an angle of view of the target region.

5. The electronic device according to claim 4, wherein the metadata is design information.

6. The electronic device according to claim 4, wherein the metadata is individual information.

7. The electronic device according to claim 1, wherein the control is performed such that a circumscribed rectangular region of the target region is displayed in a state in which the target region is identifiable.

8. The electronic device according to claim 7, wherein the control is performed such that a plurality of circumscribed rectangular regions of a plurality of target regions corresponding to a plurality of circular fish-eye images are displayed in a state in which the plurality of target regions is identifiable and the plurality of circumscribed rectangular regions are aligned without a gap.

9. The electronic device according to claim 1, wherein, in accordance with an instruction from a user, whether or not the target region is identifiably displayed is switched.

10. The electronic device according to claim 1, wherein image data of an image including a plurality of regions of a plurality of circular fish-eye images is acquired, and
the control is performed such that a plurality of target regions of the plurality of circular fish-eye images are identifiably displayed.

11. A control method of an electronic device, the method comprising:
acquiring image data of a circular fish-eye image;
acquiring metadata of the circular fish-eye image; and
performing control to display an image based on the image data,
wherein design information including at least one of a position in the circular fish-eye image corresponding to an optical axis of a lens, a radius of the circular fish-eye image, an angle of view of the circular fish-eye image, and an angle of view of a target region of equirectangular conversion in the circular fish-eye image is stored in advance in a storage for one or more lenses, the metadata is identification information of a lens used for photographing the acquired circular fish-eye image, on a basis of the identification information, in one or more design information stored in the storage, design information corresponding to the lens used for photographing the acquired circular fish-eye image is read out from the storage, and, on a basis of the read-out design information, the control is performed such that the target region is identifiably displayed.

12. A non-transitory computer readable medium that stores a program, wherein the program causes a computer to execute a control method of an electronic device, the control method comprising:

acquiring image data of a circular fish-eye image;

acquiring metadata of the circular fish-eye image; and performing control to display an image based on the image data, wherein design information including at least one of a position in the circular fish-eye image corresponding to an optical axis of a lens, a radius of the circular fish-eye image, an angle of view of the circular fish-eye image, and an angle of view of a target region of equirectangular conversion in the circular fish-eye image is stored in advance in a storage for one or more lenses, the metadata is identification information of a lens used for photographing the acquired circular fish-eye image, on a basis of the identification information, in one or more design information stored in the storage, design information corresponding to the lens used for photographing the acquired circular fish-eye image is read out from the storage, and on a basis of the read-out design information, the control is performed such that the target region is identifiably displayed.

\* \* \* \* \*